Patented Sept. 17, 1935

2,014,502

UNITED STATES PATENT OFFICE 2,014,502

SULPHONATED HIGHER FATTY ACID ESTER OF POLYHYDRIC ALCOHOLS AND ITS PRODUCTION

Karl Marx, Karl Brodersen, and Matthias Quaedvlieg, Dessau in Anhalt, Germany, assignors to I. G. Farbenindustrie Aktiengesellschaft, Frankfort-on-the-Main, Germany No Drawing. Application October 1, 1930, Serial No. 485,820. In Germany October 12, 1929

11 Claims.  (Cl. 260—106)

Our present invention relates to a new process of manufacturing agents for emulsifying, cleansing and wetting purposes. Additional objects of our invention are the new products obtainable by the process. Further objects will be seen from the detailed specification following hereafter.

Processes are known for preparing sulphonation products, fast to lime, of organic substances, among others, of fat acids and fats, by highly sulphonating them by means of a strong sulphonating agent, for example, chlorosulphonic acid, fuming sulphuric acid or sulphur trioxide. Correspondingly with the increased fastness to lime of the products obtained by this high sulphonation, however, there is a proportional decrease in their soap-like properties, such as their capacity for wetting, emulsifying and cleansing.

This invention relates to the manufacture of agents having a high emulsifying, cleansing and wetting capacity and a good protective colloid action, and having at the same time a high stability towards calcium salts and heavy metal salts.

According to the invention, these compounds are made by treating esters of higher carboxylic acids (such as fat acids, naphthenic acids, resin acids or alkylated naphthoic acids) having at least one free hydroxy group in the alcohol radicle with an aromatic hydrocarbon in the presence of a condensing and sulphonating agent. Such esters may be derived, for instance, from glycol, glycerol, erythrite, arabitol, sorbite, sugars, cellulose and derivatives of such compounds. There are mainly used acids whose alkali metal salts have a soap-like character. By mixing different esters before treatment with a sulphonating agent in the presence of an aromatic hydrocarbon, the wetting, washing and protective colloid action of the products prepared therefrom can be greatly influenced.

By condensing an ester of the kind above referred to with an aromatic hydrocarbon, with simultaneous or subsequent treatment with a sulphonating agent, or by using instead of the aromatic hydrocarbon, a sulphonic acid thereof, in which case further sulphonation may be dispensed with, the products in question are easily obtainable.

Instead of starting from a finished ester, the ester may be formed, condensed and sulphonated in one operation. For this purpose, a condensing and sulphonating agent is caused to act in the presence of an aromatic hydrocarbon, on a mixture of a polyhydric alcohol and a higher carboxylic acid, or an ester thereof which does not contain a free hydroxy group in the alcohol radicle.

It is not necessary to carry out the condensation and sulphonation respectively with the strongest sulphonating agents, such as fuming sulphuric acid, chlorosulphonic acid or the like, but concentrated sulphuric acid will suffice. When combining the condensation with the sulphonation the polyhydric alcohol may, for instance, be dispersed in the carboxylic acid or the derivative thereof and then sulphonated and condensed with the aromatic hydrocarbon, or it may be dissolved in the sulphonating agent and the carboxylic acid or the derivative thereof may be added to the solution.

The agents obtained in accordance with the invention are soluble in water, moderately concentrated acids and alkalies. They do not form precipitates with salts of the alkaline earths or with heavy metal salts. They are suitable as auxiliary agents in the wet treatment of textiles (dyeing, washing, fulling, oiling, and similar processes), leather, and other materials and particularly in operations conducted with hard water.

The following examples illustrate the invention, the parts being by weight:—

*Example 1.*—100 parts of glycerinmonostearic acid ester and 35.5 parts of naphthalene are condensed and sulphonated at about 80° C. with 265 parts of fuming sulphuric acid containing 10 per cent of sulphur trioxide. The reaction product is poured on ice and neutralized with caustic soda solution. On evaporation, an active washing agent is obtained which invariably retains its washing power, even in hard water.

The product thus obtainable probably corresponds to the formula

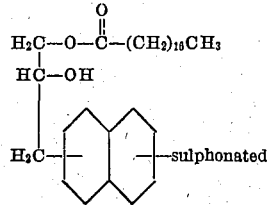

*Example 2.*—100 parts of glycerin monolauric acid ester and 46 parts of naphthalene are condensed and sulphonated at about 80° C. with 385 parts of sulphuric acid of 100 per cent strength. The mass is poured on ice and neutralized by means of caustic soda solution. After concentrating by evaporation, there are obtained 500 parts of a powdery product which has emulsifying, cleansing and wetting properties and is fast to lime.

The same product is obtained by sulphonating 46 parts of naphthalene at 80–90° C. first with 200 parts of sulphuric acid of 100 per cent strength, then introducing at 80° C. 100 parts of glycerin monolauric acid ester and carrying out the condensation at 75–85° C. with a further 200 parts of sulphuric acid of 100 per cent strength.

*Example 3.*—100 parts of the glycerin monoester of the fat acid of coconut oil are dissolved in 35 parts of xylene and condensed and sulphonated with 200 parts of fuming sulphuric acid containing 10 per cent of sulphur trioxide. After neutralization and concentration by evaporation, about 400 parts of a product are obtained having the properties referred to in the preceding example.

Instead of neutralizing the sulphonation mixture immediately after pouring it on ice, the sulphonic acids which have been formed may first be extracted by means of butyl acetate, the sulphuric acid precipitated may be separated and the pure sulphonic acids may then be neutralized.

It is obvious that our present invention is not limited by the foregoing examples or by the specific details given therein. Various modifications and changes in selecting the starting materials or in carrying out the condensation and sulphonation process, are possible.

Generally speaking, our new products are aromatic sulphonic acids corresponding to the general formula

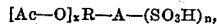
$$[Ac-O]_x R-A-(SO_3H)_n,$$

wherein Ac means the radicle of a higher organic carboxylic acid, the alkali metal salts of which show the behavior of a soap, R is the radicle of a polyhydric aliphatic alcohol, A is the radicle of an aromatic hydrocarbon of the benzene or naphthalene series, $n$ is 1 or 2 and $x$ is a whole number. In the case of glycol $x$ is 1, in the case of sorbite, however, it may be 1, 2, 3, 4 or 5.

In this formula Ac may be, for instance, the acid radicle contained in castor oil, linseed oil, rape oil, fish oil, oil of soy beans, cotton oil, sunflower oil, wood oil, hemp oil, poppy-seed oil, walnut oil, maize oil, sesame oil or even of saturated oils, such as palm oil.

A few simple comparative experiments should be made to determine the best kind of sulphonating agent and the most suitable temperature to employ with particular reaction components. All such variations are considered to be within the spirit of the invention and the scope of the following claims.

What we claim is:—

1. The process which comprises reacting a mixture consisting of an aromatic hydrocarbon of the benzene or naphthalene series and an ester derived from a polyhydric alcohol and a higher carboxylic acid whose alkali metal salts show the behavior of a soap, said ester containing at least one free OH group, with a condensing and sulphonating agent of the group consisting of concentrated sulphuric acid, fuming sulphuric acid and chlorosulphonic acid.

2. The process which comprises reacting a mixture consisting of an aromatic hydrocarbon of the benzene or naphthalene series and a glycerin monoester of a higher carboxylic acid the alkali metal salts of which show the behavior of a soap, with a condensing and sulphonating agent of the group consisting of concentrated sulphuric acid, fuming sulphuric acid and chlorosulphonic acid.

3. The process which comprises reacting a mixture consisting of naphthalene and a glycerin monoester of a higher carboxylic acid the alkali metal salts of which show the behavior of a soap, with a condensing and sulphonating agent of the group consisting of concentrated sulphuric acid, fuming sulphuric acid and chlorosulphonic acid.

4. The process which comprises reacting a mixture consisting of naphthalene and a glycerin monoester of a higher carboxylic acid the alkali metal salts of which show the behavior of a soap, with concentrated sulphuric acid.

5. The process which comprises reacting a mixture consisting of glycerin monolauric acid and a naphthalene sulphonic acid with concentrated sulphuric acid.

6. The process which comprises reacting a mixture consisting of glycerin monolauric acid and naphthalene with concentrated sulphuric acid.

7. The condensation products corresponding to the general formula

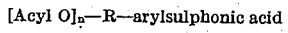
$$[Acyl\ O]_n-R-arylsulphonic\ acid$$

wherein R means the radicle of a polyhydric alcohol which may contain a free OH group, the arylsulphonic acid radicle is of the benzene or naphthalene series, acyl means the radicle of a higher carboxylic acid the alkali metal salts of which show the behavior of a soap, and wherein $n$ is a number ranging from 1 to $x-1$, $x$ being the number of the OH groups originally contained in the polyhydric alcohol.

8. The condensation products corresponding to the general formula

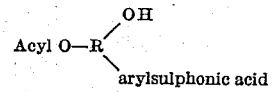

wherein R means the radicle of a polyhydric alcohol, the arylsulphonic acid radicle is of the benzene or naphthalene series, acyl means the radicle of a higher carboxylic acid the alkali metal salts of which show the behavior of a soap, said products being the the dry state and in the form of the sodium salt a powder which dissolves easily in water, acting as an emulsifying, cleansing and wetting agent and which is not separated in hard water.

9. The condensation products corresponding to the general formula

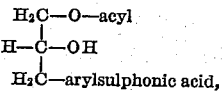

wherein the arylsulphonic acid radicle is of the benzene or naphthalene series, acyl means the radicle of a higher carboxylic acid the alkali metal salts of which show the behavior of a soap, said products being in the dry state and in the form of the sodium salt a powder which dissolves easily in water, acting as emulsifying, cleansing and wetting agent and being not separated in hard water.

10. The condensation product corresponding to the general formula

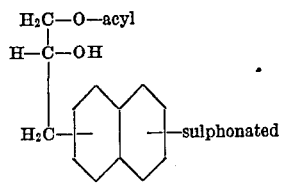

wherein acyl means the radicle of a higher carboxylic acid the alkali metal salts of which show the behavior of a soap, said product being in the dry state and in the form of the sodium salt a powder which dissolves easily in water, acting as emulsifying, cleansing and wetting agent and being not separated in hard water.

11. The condensation product corresponding to the formula

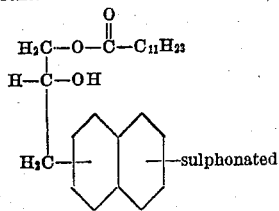

said product being in the dry state and in the form of the sodium salt a powder which dissolves easily in water, acting as emulsifying, cleansing and wetting agent and being not separated in hard water.

KARL MARX.
KARL BRODERSEN.
MATTHIAS QUAEDVLIEG.